United States Patent [19]

Hürnik et al.

[11] Patent Number: 4,623,686
[45] Date of Patent: Nov. 18, 1986

[54] STORAGE STABLE COMPOSITIONS BASED ON POLYVINYL CHLORIDE PLASTISOLS AND STABILIZED ISOCYANATES

[75] Inventors: Helmut Hürnik; Gerhard Grögler; Heinrich Hess, all of Leverkusen; Richard Kopp, Cologne, all of Fed. Rep. of Germany

[73] Assignee: Bayer Aktiengesellschaft, Leverkusen, Fed. Rep. of Germany

[21] Appl. No.: 694,562

[22] Filed: Jan. 24, 1985

[30] Foreign Application Priority Data

Feb. 2, 1984 [DE] Fed. Rep. of Germany ........ 3403497

[51] Int. Cl.$^4$ ............................................. C08K 5/34
[52] U.S. Cl. .................... 524/101; 524/197; 524/513; 524/567; 524/569; 528/45; 528/75; 528/144
[58] Field of Search ............... 524/197, 101, 567, 569, 524/513; 528/45, 75, 144

[56]  References Cited

U.S. PATENT DOCUMENTS 4,076,774  2/1979  Short ........................................ 264/4
4,518,729  5/1985  Breidenbach et al. ............... 524/197

FOREIGN PATENT DOCUMENTS 240267   4/1960  Australia ............................ 524/197
1103202  2/1968  United Kingdom .
1199702  7/1970  United Kingdom .
1455701  11/1976  United Kingdom .
2051846  1/1981  United Kingdom .

OTHER PUBLICATIONS

Kunststoffen 68, (1978) pp. 735 et seq., 800 et seq.
Extramural Eng. Inst., 0931732, May 1982.

Primary Examiner—Joseph L. Schofer
Assistant Examiner—J. M. Reddick
Attorney, Agent, or Firm—Gene Harsh; Joseph C. Gil

[57] ABSTRACT

The invention relates to novel compositions for coating purposes comprising
(A) polyvinyl plastisols,
(B) surface modified, finely divided, stabilized polyisocyanates with retarded reactivity, in which 0.1 to 25 equivalents-% of the isocyanate groups of the unstabilized polyisocyanate have been deactivated on the surface, preferably by a reaction with polyamines, hydrazine, alkylhydrazines, polyhydrazide compounds and/or selected amidine and/or guanidine compounds; and
(C) plasticizers and/or lightly branched, relatively high molecular weight polyhydroxyl compounds having melting points below 60° C. and compatible with PVC plastisol.

The invention also relates to the use of these storage stable but heat curable mixtures as primers for PVC coatings on plastics, foils, textile sheet products or filaments and as primer coats for flocking.

10 Claims, No Drawings

STORAGE STABLE COMPOSITIONS BASED ON POLYVINYL CHLORIDE PLASTISOLS AND STABILIZED ISOCYANATES

BACKGROUND OF THE INVENTION

When organic substrates, in particular those having groups capable of reacting with isocyanate end groups, are coated with polyvinyl chloride (PVC) plastisols or with melts of soft PVC, the bond strength of the coating is often insufficient for practical purposes. So-called bonding agents are therefore used to improve the bond strength (see Beschichten mit Kunststoffen, Carl Hanser Verlag, Munich 1967, and Kunststoffe, 68, (1978), page 735 et seq and page 800 et seq).

The coating of textile sheet products, in particular those based on polyamides (e.g. Nylon 6, Nylon 66 or aramides) or polyesters (in particular polyethylene terephthalates or polybutylene terephthalates) cannot be carried out satisfactorily with PVC plastisols alone because the strength of the bond obtained is insufficient. For this reason, a primer coating based on PVC plastisol containing isocyanate is first applied to the textile sheet. This primer coat develops a firm bond to the textile substrate and to the subsequently applied layers of pure PVC.

Suitable isocyanate bonding agents for this purpose, include, for example, the solution of isocyanato isocyanurates in plasticizers described in German Auslegeschrift No. 2,419,016. Suitable bonding agents have also been described in German Offenlegungsschrift No. 3,041,732. When such one-component bonding agents are mixed with plastisol, the isocyanates are found to react with traces of water as well as with other reaction components or catalytically active substances present in the plastisol mixture (e.g. metal stabilizers for PVC).

Apart from these one-component bonding agents (containing only polyisocyanates), two-component bonding agents composed of hydroxyl polyesters and polyisocyanates as solutions or in solid form have been in use for many years (see e.g. German Pat. No. 957,117 and German Ausleschrift No. 1,719,123).

The main disadvantage of all these systems, however, is the limited storage stability of the PVC plastisols which contain these polyisocyanate bonding additives. Due to the above mentioned reactions of the isocyanates as well as reactions with atmospheric moisture, undesirable increases in viscosity occur which limit the storage stability of such mixtures even at room temperature.

It was therefore an object of the present invention to provide new bonding agents for PVC plastisols so that PVC plastisols containing polyisocyanate-based bonding agents could be obtained with a very high stability in storage but with the capacity for excellent adherence when heat cured.

DESCRIPTION OF THE INVENTION

The present invention thus relates to PVC plastisol-based compositions comprising
(A) PVC plastisols;
(B) surface modified, finely divided, stabilized polyisocyanates with retarded reactivity, in which from 0.1 to 25 equivalent % of the isocyanate groups of the unstabilized polyisocyanate have been deactivated; and
(C) plasticizers and/or lightly branched, relatively high molecular weight polyhydroxyl compounds compatible with PVC plastisol and having melting points below 60° C. The compositions are stable in storage but are heat curable at temperatures from 100° to 200° C.

It is preferred that the unstabilized polyisocyanate be a solid, finely divided di- and/or polyisocyanate have a high melting point above 40° C. and, preferably above 80° C. It is also preferred that the specified amount of isocyanate groups be deactivated by reaction with reactive functional compounds, preferably with aliphatic polyamines, hydrazine, alkylhydrazines, N,N'-dialkyl hydrazines, polyhydrazide compounds with NCO-reactive hydrogen and/or selected amidine and/or guanidine compounds, wherein these selected compounds have no NCO-reactive hydrogen. It is also preferred that from 0.1 to 8 equivalent % of the isocyanate groups be deactivated. The invention also relates to the use of these storage stable but heat curable mixture in a process, where these mixtures are applied as primer coats of PVC coatings on plastics, foils, textile sheet products or filaments and as primer coats for flocking.

The starting materials used for the claimed mixtures include the usual, finely divided vinyl resins which can be made up into pastes, preferably vinyl chloride homopolymers and/or vinyl chloride copolymers, for example with vinyl acetate as cocomponent, such as those conventionally used in the art for coating purposes (see e.g. Kunststoff-Handbuch, Volume 2, "Polyvinylchlorid", Carl-Hanser-Verlag, Munich 1963).

To prepare the PVC plastisols, as is known in the art, the vinyl resins are homogeneously dispersed in plasticizers. The plasticizers used for polyvinyl chloride may be the liquids conventionally used for this purpose. Preferred are esters which have a boiling point of at least 250° C. at normal pressure or which are non-distillable at normal pressure and preferably liquid at room temperature. Such esters, as is known, can be produced from (1) Alkanesulphonic acids having 9 to 20 carbon atoms; fatty acids having 12 to 18 carbon atoms; alkane dicarboxylic acids having 6 to 10 carbon atoms; aromatic di- or polycarboxylic acids having 8 to 10 carbon atoms (the sum of carbon atoms mentioned including in each case the carbon atoms of the carboxyl groups); or phosphoric acid; and (2) monohydric aliphatic alcohols having 1 to 13 (preferably 4 to 10) carbon atoms with linear or branched carbon chains; phenols having 6 to 20 (preferably 6 or 7 carbon atoms), and/or araliphatic alcohols having 7 to 20 (preferably 7 or 8 carbon atoms).

Specific esters include e.g., di-2-ethylhexylphthalate, di-isodecyl-phthalate, butyl-benzylphthalate, 2-ethylhexyl-benzyl-phthalate, tri-2-ethylhexylphosphate, 2-ethylhexyl-diphenylphosphate, isodecyl-diphenylphosphate, tricresylphosphate, cresyl-diphenylphosphate, tris-(nonylphenyl)-phosphate, tris-(isopropylphenyl)-phosphate, di(2-ethylhexyl)-adipate, di-isodecyladipate, di-(2-ethylhexyl)-azelate, di-(2-ethyl-hexyl)-sebacate, tri-(2-ethylhexyl)-trimellitate, and the like.

Further details about plasticizers known in the art may be found in Gächter/Müller, Taschenbuch der Kunststoff-Additive, publishers Carl Hanser Verlag, Munich, Vienna, 1983, page 261 et seq; and in K. Thinius, Chemie, Physik und Technologie der Weichmacher, publishers VEB Deutscher Verlag für Grundstoffindustrie, Leipzig, 1963.

The proportion of vinyl resin to plasticizer in the plastisol depends upon the particular field of application and practical requirements. The proportion is generally chosen to result in a plastisol having the usual pasty consistency for spread coating. The proportion by weight of vinyl resin/plasticizer may vary from 80/20 to 20/80 but is preferably in the region of 70/30 to 35/65 and most preferably from 65/35 to 50/50.

The lightly branched, relatively high molecular weight polyhydroxyl compound used (component C) must be compatible with the PVC plastisol, have hydroxy functionalities of $\geq 2$ (e.g. $\geq 2.1$) up to about 4, and have OH numbers of about 15 to 150. It is preferred that such compounds have functionalities of $\geq 2.5$ and $\geq 3$, OH numbers from 20 to 120 and melting points below 60° C., and preferably below 45° C.

Hydroxyl group-containing polyesters are preferred. Preferred are polyesters of aliphatic di- or tricarboxylic acids (preferably those having at least 6 carbon atoms in a linear or branched chain such as adipic acid, pimelic acid, suberic acid, azelaic acid, sebacic acid and/or 2,2,4-trimethyladipic acid) or dimeric fatty acids, and diols (preferably those having at least three carbon atoms) and/or low molecular weight polyols. Preferred diols include saturated, branched or unbranched alkane diols such as propane-1,2-diol, propane-1,3-diol, butane-1,3-diol, butane-1,4-diol, pentane-1,5-diol, 2,2-dimethyl-propane-1,3-diol, hexane-1,6-diol, methylhexane-1,6-diol or dimethyl-pentanediols. Preferred polyols are alkane or cycloalkane polyols having at least three hydroxyl groups, e.g. trimethylolpropane-1,1,1; hexanetriol-1,2,6; glycerol or other triols. In addition to the aliphatic di- and tri-carboxylic acids, minor proportions of cycloaliphatic dicarboxylic acids, e.g. hexahydrophthalic acid, or aromatic dicarboxylic acids, e.g. phthalic acid or isophthalic acid, may be included.

Lactones such as $\epsilon$-caprolactone or alkyl- $\epsilon$-caprolactones or valerolactones may also be used for polyester formation. Polycarbonates in particular those based on hexane-1,6-diol, and other cocomponents, based on diols or triols, for example, may also be used.

Apart from these polyesters, minor quantities of other, known, relatively high molecular weight polyhydroxyl compounds may be used if desired, provided they are compatible or miscible with the plastisol, e.g. polyoxytetramethylene diols.

The stabilized, solid polyisocyanates with retarded reactivity to be used according to this invention are solid, finely divided polyisocyanates of the kind which, as a result of a deactivation of finely divided polyisocyanates with surface modifying "stabilizers" such as (aliphatic) polyamines, hydrazine, alkylhydrazines, N,N'-dialkylhydrazines, hydrazide compounds having two or more —CO—NH—NH$_2$ end groups and selected amidines or guanidines, give rise to deactivation of from about 0.1 to 25%, preferably from 0.1 to 8%, and most preferably from 0.2 to 5% of the isocyanate groups originally present.

Suitable techniques for such deactivation can be found, for example, in U.S. Pat. No. 4,400,497 and allowed U.S. patent application Ser. No. 514,410, filed on July 18, 1983, now U.S. Pat. No. 4,483,974. The deactivation is formed mainly from a thin layer of polyaddition product and only a minor reaction of the isocyanate groups on the surface of the solid polyisocyanate particles. The stabilization or deactivation reaction by means of envelopment with polyadduct results in polyisocyanate particles which are storage stable in the compositions of the invention, even in the presence of polyhydroxyl compounds containing OH end groups, metal catalysts or atmospheric moisture.

Such stabilized isocyanates enter into reactions as polyisocyanates only above a certain temperature or when the polyadduct layer is dissolved by polar solvents. They then produce the desired increased adherence to the substrate.

The "polyadduct" envelope on the solid polyisocyanate particles varies somewhat according to the nature of the "stabilizers". Polyamines give rise to polyurea envelopes, hydrazine(s) form polyhydrazodicarbonamide envelopes while polyhydrazide compounds containing —CO—NH—NH$_2$ end groups (such as dihydrazides, bis-semicarbazides, bis-carbazic esters, semicarbazide hydrazides or amino hydrazides) form even more complex polyadducts with a large number of differently arranged NH and CO groups in the polymer chain.

Amidines and guanidines which do not contain any hydrogen atoms that are reactive against NCO-groups at room temperature are also suitable for stabilizing the solid polyisocyanates. The stabilization reaction with these compounds is particularly surprising and gives rise to exceptionally advantageous properties since the addition product decomposes at higher temperatures and then no longer inactivates the isocyanate reactions but catalyzes them very powerfully in the homogeneous phase.

Any di- or polyisocyanates or mixtures thereof are suitable starting components for the solid polyisocyanates stabilized according to the invention, provided they have melting point above 40° C., preferably above 80° C., most preferably above 100° C.

These isocyanates may be aliphatic, cycloaliphatic or araliphatic polyisocyanates but are preferably aromatic or heterocyclic polyisocyanates. Other suitable polyisocyanates include the polyphenyl-polymethylene polyisocyanates obtained by aniline-formaldehyde condensation followed by phosgenation as described in British Pat. Nos. 874,430 and 848,671; perchlorinated aryl polyisocyanates; polyisocyanates containing carbodiimide groups; polyisocyanates containing allophanate groups; polyisocyanates containing isocyanurate groups; polyisocyanates containing urethane or urea groups; polyisocyanates containing acylated urea groups; polyisocyanates containing biuret groups; polyisocyanates prepared by telomerization reactions; and polyisocyanates containing ester groups. Diisocyanates containing uretdione groups and diisocyanates containing urea groups are also preferred. The following are mentioned as examples of suitable polyisocyanates:

1,5-Diisocyanatomethylnaphthalene: M.p. 88°–89° C.
1,4-phenylenediisocyanate: 94°–96° C.
1,3-dimethylbenzene-4,6-diisocyanate: 70°–71° C.
1,4-dimethylbenzene-2,5-diisocyanate: 76° C.
1,4-dichlorobenzene-2,5-diisocyanate: 134°–137° C.
1-methoxybenzene-2,4-diisocyanate: 75° C.
1-methoxybenzene-2,5-diisocyanate: 89° C.
1,3-dimethoxybenzene-4,6-diisocyanate: 125° C.
azobenzene-4,4'-diisocyanate: 158°–161° C.
diphenylether-4,4'-diisocyanate: 66°–68° C.
diphenyl-dimethylmethane-4,4'-diisocyanate: 92° C.
naphthalene-1,5-diisocyanate: 127°–130° C.
3,3'-dimethyl-biphenyl-4,4'-diisocyanate: 68°–69° C.
diphenylsulphone-4,4'-diisocyanate: 154° C.
4,4'-diisocyanato-(1,2)-diphenyl-ethane: 88°–90° C.
dimeric 1-methyl-2,4-phenylenediisocyanate: 156° C.
dimeric 1-isopropyl-2,4-phenylenediisocyanate: 125° C.

dimeric 1-chloro-2,4-phenylenediisocyanate: 177° C.
dimeric 2,4′-diisocyanato-diphenylsulphone: 178°–180° C.
dimeric diphenylmethane-4,4′-diisocyanate;
3,3′-diisocyanato-4,4′-(or -2,2′)-dimethyl-N,N′-diphenylurea;
N,N′-bis[4(4-isocyanatophenylmethyl)phenyl]urea;
N,N′-bis[4(2-isocyanatophenylmethyl)phenyl]urea;
trimeric 2,4′-diisocyanatotoluene (isocyanurate isocyanate);
trimeric 4,4′-diisocyanatodiphenylmethane (isocyanurate isocyanate);
trimeric isophorone diisocyanate (isocyanurate isocyanate)
and the adduct of 3 mols of 2,4-diisocyanatotoluene with 1 mol of trimethylolpropane.

Mixed trimers based on, for example, TDI/MDI, TDI/HDI or products as described in German Offenlegungsschrift No. 3,041,732 are also suitable.

The following are preferred according to the invention: 3,3′-Diisocyanato-4,4′-dimethyl-N,N′-diphenylurea; dimeric 2,4-diisocyanatotoluene; dimeric 4,4′-diisocyanatodiphenylmethane; 3,3′-dimethyl-4,4′-diisocyanatodiphenylmethane; and the isocyanurates (trimers) based on 2,4-diisocyanato-toluene, 4,4′-diisocyanatodiphenylmethane and isophorone diisocyanate. The dimeric and trimeric diisocyanates may also be prepared by in situ dimerization or trimerization, in a finely divided form, for example in plasticizers, solvents or polyols, and may be subjected to the stabilization reaction in this form.

The following classes of compounds may be used for stabilization or deactivation of the above-mentioned polyisocyanates:

1. aliphatic or cycloaliphatic di- and polyamines,
2. hydrazine, alkylhydrazines, N,N′-dialkylhydrazines and di- and polyhydrazide compounds, and
3. acyclic, monocyclic or bicyclic amidines and guanidines having the structure mentioned.

The amine stabilizers used may be difunctional or higher functional low molecular weight or relatively high molecular weight compounds containing aliphatically bound primary and/or secondary amino groups and having molecular weights of from 60 to about 6000, preferably from 60 to 3000. These compounds are low molecular weight and/or relatively high molecular weight primary and/or secondary polyamines, and are preferably diamines. The amino groups in these amines are attached to aliphatic groups (including cycloaliphatic groups) or to the aliphatic moiety of araliphatic groups. The aliphatic or cycloaliphatic di- and polyamines may contain OH groups, tertiary amino groups, ether groups, thioether groups, urethane groups, urea groups, carboxyl groups or carboxylic acid alkyl ester groups in addition to the amino groups.

Suitable di- and polyamines for use as stabilizers include, for example, ethylene diamine; 1,2- and 1,3-propanediamine; 1,4-butanediamine; 1,6-hexanediamine; neopentanediamine; 2,2,4- and 2,4,4-trimethyl-1,6-diamino-hexane; 2,5-dimethyl-2,5-diaminohexane, 1,10-decanediamine; 1,11-undecanediamine; 1,12-dodecanediamine; bis-aminomethyl-hexahydro-4,7-methanoindane (TCD-diamine); 1,3-cyclohexanediamine; 1,4-cyclohexanediamine; 1-amino-3,3,5-trimethyl-5-aminomethyl-cyclohexane (isophoronediamine); 2,4- and/or 2,6-hexahydrotolylenediamine; 2,4′- and/or 4,4′-diaminodicyclohexylmethane; m- or p-xylylenediamine; bis-(3-amino-propyl)-methylamine; bis-N,N′-(3-amino-propyl)-piperazine; 1-amino-2-aminomethyl-3,3,5-(3,5,5)-trimethylcyclopentane; 2,2-dialkylpentane-1,5-diamines; 1,5,11-triaminoundecane; 4-aminomethyl-1,8-diamino-octane; lysine methyl ester; cycloaliphatic triamines according to German Offenlegungsschrift No. 2,614,244; 4,7-dioxadecane-1,10-diamine; 2,4- and 2,6-diamino-3,5-diethyl-1-methylcyclohexane and mixtures thereof; alkylated diaminodicyclohexylmethanes, (e.g. 3,3′-dimethyl-5,5′-diamino-dicyclohexylmethane or 3,5-diisopropyl-3′,5′-diethyl-4,4′-diaminodicyclohexyl methane); perhydrogenated diaminonaphthalenes; perhydrogenated diaminoanthracenes; as well as higher valent amines such as diethylenetriamine, triethylenetetramine, pentaethylenehexamine, dipropylenetriamine, tripropylene tetramine or N,N′-dimethylethylenediamine; 2,5-dimethyl piperazine; 2-methylpiperazine; piperazine (hydrate); 2-hydroxyethylpiperazine, and the like.

In addition to these low molecular weight aliphatic diamines or in admixture with them there may also be used relatively high molecular weight aliphatic di- and polyamines such as those obtained, for example, by reductive amination of polyoxyalkylene glycols with ammonia as described in Belgian Pat. No. 634,741 or U.S. Pat. No. 3,654,370. Other relatively high molecular weight polyoxyalkylene polyamines may be prepared by methods such as those listed in the in-house publication "Jeffamine, Polyoxypropylene Amines" by Texaco Chemical Co., 1978; by the hydrogenation of cyanoethylated polyoxypropylene glycols (German Offenlegungsschrift No. 1,193,671); by amination of polypropylene glycol sulphonic acid esters (U.S. Pat. No. 3,236,895); by treatment of a polyoxyalkylene glycol with epichlorohydrin and a primary amine (French Pat. No. 1,466,708); or by the reaction of isocyanate prepolymers with hydroxyl-containing enamines, aldimines or ketimines, followed by hydrolysis, as described in German Auslegeschrift No. 2,546,536. Suitable relatively high molecular weight aliphatic di- and polyamines also include the polyamines obtainable according to German Offenlegungsschriften Nos. 2,948,419 and 3,039,600 by alkaline hydrolysis of isocyanate prepolymers (obtained from aliphatic diisocyanates). These relatively high molecular weight polyamines have molecular weights of about 400 to 3000. Due to their structure, such relatively high molecular weight polyamines are particularly suitable for the formation of a non-friable, "elastic" polyurea envelope. They are therefore used for amine stabilization of the polyisocyanate particles, preferably in admixture with low molecular weight di- and polyamino compounds.

The stabilizers used for the above mentioned polyisocyanates may also be hydrazine, alkylhydrazines or N,N′-dialkylhydrazines [preferably having $C_1$–$C_6$-alkyl groups and optionally also containing chlorine or OH groups as further substituents (molecular weights preferably from 32 to 198)] and/or difunctional or higher functional low molecular weight or relatively high molecular weight compounds carrying —CO—NH—$NH_2$ end groups and having molecular weights of from 90 to about 6000, preferably from 90 to 3000. Examples of such compounds include hydrazine (usually in the form of hydrazine hydrate); and alkyl substituted hydrazines (e.g. methylhydrazine, ethyl-hydrazine, hydroxyethylhydrazine or N,N′-dimethylhydrazine). Compounds carrying hydrazide end groups are also suitable stabilizers and include e.g. di- and polyhydrazides such as carbodihydrazide, hydracrylic acid hydrazide, oxalic acid dihydrazide, adipic acid dihydrazide, terephthalic acid dihydrazide, isophthalic acid hydrazide or compounds containing hydrazide and semicarbazide, carbazic ester or amino groups, e.g. β-semicarbazidopropionic acid hydrazide, 2-semicarbazidoethylene carbazic ester, amino-acetic acid hydrazide, β-aminopropionic acid hydrazide or bis-carbazic esters or ethylene-bis-semicarbazide or isophorone-bissemicarbazide. Hydrazine and low molecular weight compounds carrying CO—NH—NH$_2$ groups and having molecular weights of from 32 to 399 are preferred. Hydrazine hydrate and β-semicarbazido-propionic acid hydrazide and alkylene-bis-semicarbazides are particularly preferred out of these hydrazine compounds.

Particularly suitable stabilizers are acyclic, monocyclic or bicyclic compounds which contain the amidine and/or guanidine group

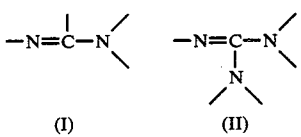

(I)　　　(II)

once or several times and are free from any hydrogen atoms capable of reacting with isocyanates at room temperature.

The acyclic, monocyclic and bicyclic amidine and guanidine compounds will be briefly referred to in this application as "amidine/guanidine compounds" or "compounds having amidine/guanidine groups" or quite simply as "amidine/guanidine stabilizers".

The amidines to be used include acyclic or cyclic amidines, preferably those corresponding to formula (III) to (VII):

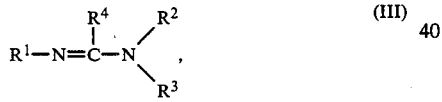

wherein
R$^1$ and R$^4$, may be the same or different and represent H, a straight chain or branched aliphatic hydrocarbon group with 1 to 18 carbon atoms, (preferably 1 to 4 carbon atoms), a cycloaliphatic hydrocarbon group with 5 to 7 ring carbon atoms, an araliphatic group or an aromatic group, preferably with 6–10 C-atoms in the aromatic rings and optionally 1–6 C-atoms in the aliphatic (including cycloaliphatic) portion, any of which groups may have inert substituents and/or may be interrupted by the structural units —O—, —S—, or —N-alkyl, preferably —C$_1$-C$_6$-alkyl, or —N-cycloalkyl, preferably C$_5$-C$_7$-cycloalkyl, and R$^2$ and R$^3$ may be the same or different and can be the same as R$^1$ or can be a group such as alkylene-N-(di-alkyl) groups or alkylene-N-(di-cycloalkyl) groups, preferably —(CH$_2$)$_n$-N-(C$_1$ to C$_6$-alkyl)$_2$ group, where n=2–12, but cannot be H.

The amidines are most preferably mono- or bicyclic amidines in which any two of the groups R$^1$ to R$^4$ may be joined together to form a ring. Several amidine groups may be joined together through multivalent groups.

Such cyclic amidines preferably correspond to formulae (IV) to (VII). In amidines corresponding to formula (IV)

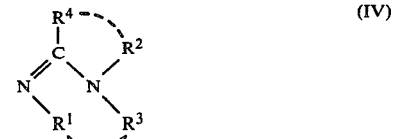

the groups R$^1$ and R$^3$ together and/or the groups R$^2$ and R$^4$ together represent an optionally branched alkylene group having 2 to 5 carbon atoms in the alkylene chain, preferably the —(CH$_2$)$_2$— or —(CH$_2$)$_3$— group, optionally containing hetero atoms or groups such as —O—, —S— or —N-alkyl, preferably —C$_1$-C$_6$-alkyl, groups. In amidines corresponding to the formula (V)

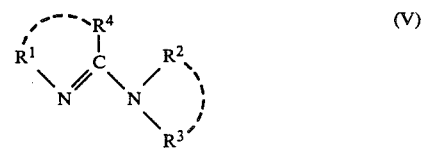

the groups R$^1$ and R$^4$ together and/or the groups R$^2$ and R$^3$ together represent an optionally branched alkylene group having 2 to 5 carbon atoms in the alkylene chain, preferably the —(CH$_2$)$_2$— or —(CH$_2$)$_3$— group, optionally containing hetero atoms such as —O— or —S—. The cyclic amidines may also correspond to formula (VI) containing several amidine groups:

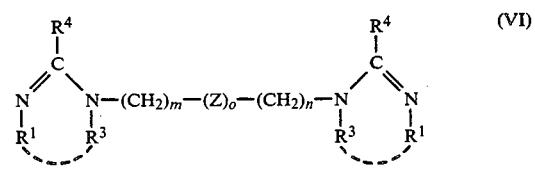

in which
Z represents a N-alkyl, preferably a —C$_1$-C$_4$-alkyl group, a straight chained or branched C$_2$ to C$_{14}$-alkylene group optionally interrupted by —O— in the chain, a cycloalkane group having 5 to 8 ring members or a dicyclohexyl-(C$_1$-C$_4$-alkane) group and m and n may be identical or different integers from 2 to 10, preferably 2 or 3, and o denotes zero or 1. Particularly preferred amidines include those corresponding to formula (VII)

wherein
p=2, 3 or 4,
R$^4$=straight chained or branched C$_1$-C$_4$-alkyl (e.g. methyl, ethyl, isopropyl or tert.-butyl),
R$^2$=straight chained or branched C$_1$-C$_4$-alkyl, —(CH$_2$)$_p$.N. (R$^4$)$_2$ or C$_5$-C$_7$-cycloalkyl.

The following are examples of acyclic amidines (III):
N,N-Dimethylformamidine, N,N-dimethylacetamidine, N,N-diethyl-formamidine, N,N-dimethyl-N'-benzyl-N'-acetamidine, N,N-dicyclohexyl-N'-methylacetamidine, N,N-dimethyl-N'-cyclohexylformamidine, and N,N-dimethyl-N'-tert.-butyl-formamidine.

The following are examples of particularly preferred monocyclic amidines (IV):
1,2-Dimethyl-Δ2-imidazoline, 1-methyl-2-phenyl-Δ2-imidazoline, 1(N)-methyl-Δ2-imidazoline,Δ2-benzylamino-N-methyl-caprolactam, 2-butylimino-N-methylbutyrolactam,
1,8-Diaza-bicyclo[5,3,0]-dec-7-ene,
1,8-Diaza-bicyclo[5,4,0]-undec-7-ene,
1,7-Diaza-bicyclo[4,4,0]-dec-6-ene,
1,6-Diaza-bicyclo[3,4,0]-non-5-ene,
1,5-Diaza-bicyclo[4,3,0]-non-5-ene,
1,14-Diaza-bicyclo[11,4,0]-heptadec-13-ene,
1-(N)-Methyl-Δ2-tetrahydropyrimidine,
1-Cyclohexyl-2-methyl-Δ2-tetrahydropyrimidine,
1-Cyclohexyl-Δ2-tetrahydropyrimidine,
1-Benzyl-2-butyl-Δ2-tetrahydropyrimidine,
1-Methyl-2-methyl-Δ2-tetrahydropyrimidine,
1-Butyl-2-methyl-Δ2-tetrahydropyrimidine,
1-(2-Ethylhexyl)-2-methyl-Δ2-tetrahydropyrimidine,
1-Dodecyl-2-methyl-Δ2-tetrahydropyrimidine,
1-(1-Methylcyclohexyl)-2-methyl-Δ2-tetrahydropyrimidine,
1-(2-Methylhexyl)-2-methyl-Δ2-tetrahydropyrimidine,
1-(3,3,5-Trimethylcyclohexyl)-2-methyl-Δ2-tetrahydropyrimidine.

Compounds of this type may be synthesized in particular in accordance with the instructions given in German Auslegeschrift No. 2,439,550.

Particularly preferred amidines are those of type IVa):

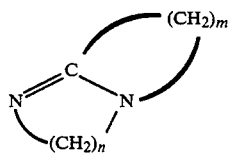

wherein
m represents 2, 3, 4, 5 or 11 and
n represents 2, 3, or 4.

The preparation of a number of such compounds has been described, for example, in German Pat. No. 1,545,855.

The following are examples of compounds of type IV containing a dialkylaminoalkyl side group, R²: 1-(3-N,N-Dimethylamino-propyl)-2-methyl-Δ2-tetrahydropyrimidine, and 1-(2-N,N-Dimethylaminoethyl)-2-methyl-Δ2-tetrahydropyrimidine. They may be prepared according to the instructions given in German Auslegesschrift No. 3,049,131.

The following are examples of amidines corresponding to formula (V):

1-Methyl-4-(2-tetrahydroazepinyl)-piperazine

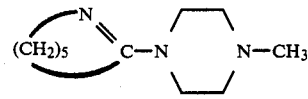

-continued

Phenyl-methyl-(2-tetrahydroazepinyl)-amine

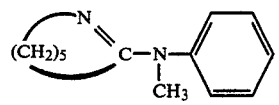

Benzyl-methyl-(2-tetrahydroazepinyl)-amine

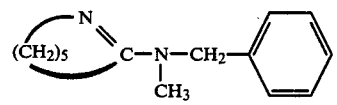

4-(2-Tetrahydroazepinyl)-morpholine

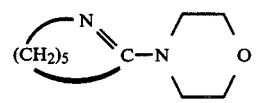

The acyclic amidines or cyclic or bicyclic amidines obtained by the linking together of two groups, are described in German Auslegeschrift No. 2,722,514.

General information on the synthesis of amidines may be found in Houben-Weyl, Methoden der Organischen Chemie, Volume XI, 2, pages 38 to 66, publishers G. Thiem, Stuttgart 1958.

The following is an example of compounds of the type corresponding to formula (VI):

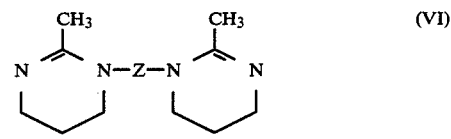

(VI)

wherein
Z preferably has one of the following meanings:
—(CH₂)₂—
—(CH₂)₆

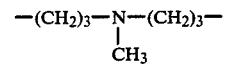

—(CH₂)₆—NH—CO—O—(CH₂)₃—O—(CH₂)₃—O—CO—NH(CH₂)₆—    or    —(CH₂)₂—O—(CH₂)₂—.

These compounds are obtained by the methods described in German Auslegeschrift No. 3,049,131.

The guanidines, preferably corresponding to formula (VIII), include acyclic or cyclic guanidines or di- or tri-guanidines or compounds which may contain the guanidine group several times:

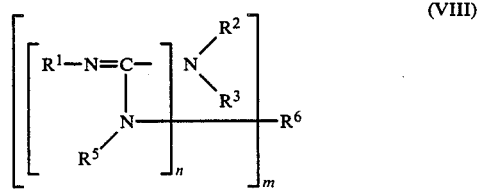

(VIII)

In formula (VIII), the various symbols have the following meanings:
m=1 or 2, n=1, 2 or 3, preferably 1, (when m=1) and 1 (when m=2);

$R^1$, $R^2$, $R^3$ represent the groups already described for the amidine of formula (III);

$R^5$ has the same meaning as $R^2$, and $R^6$ is either a monovalent group of the type mentioned for $R^2$ or a divalent alkylene group optionally interrupted by —O—, —N(alkyl)—, preferably $C_1$-$C_6$-alkyl-, or —N(cycloalkyl); preferably $C_5$-$C_7$-cycloalkyl-groups.

When n=1, two of the groups $R^1$, $R^2$, $R^3$, $R^5$ and $R^6$ may be joined together to form a ring so that cyclic guanidines having the following structure may also be formed:

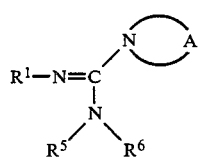
(VIII-a)

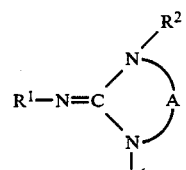
(VIII-b)

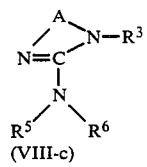
(VIII-c)

(VIII-d)

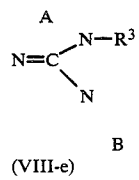
(VIII-e)

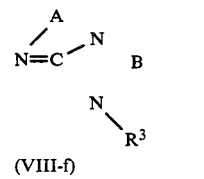
(VIII-f)

In formulae (VIIIa to VIIIf), the groups A and B result from the linkage of two substituents represent bivalent, aliphatic, cycloaliphatic, araliphatic or aromatic carbon chains having at least two, preferably 2 to 5 chain members and optionally interrupted by hetero atoms (—O—, —S—, —N(alkyl)—), or substituted with isocyanate inert substituents (e.g. halogen, alkyl).

Other suitable guanidines are given in the following summary.

| Substituents on the nitrogen | Substituted x-times | in the following primary guanidine structures |
|---|---|---|
| methyl-, ethyl-, (iso)propyl-, (iso)butyl-, (tert.)-butyl-, (iso)pentyl-, hexyl-, 2-ethylhexyl-, octyl-, dodecyl-, stearyl-, ethoxypropyl-, butoxyhexyl-, cyanoethyl-, cyanohexyl-, butoxycarbonyl-methyl-, methoxycarbonylmethyl-, dimethylaminopropyl-, cyclopentyl-, cyclohexyl-, (chloro)benzyl-, phenethyl-, phenyl-, tolyl-, methoxyphenyl-, ethoxycarbonylphenyl-, | tetra- | $\begin{array}{c}NH\\ \parallel\\ N-C-N\end{array}$ |
| | penta- | $\begin{array}{c}N-C-N\\ \mid\\ N\end{array}$ |
| | tri- | (cyclic structure) |
| | tri- | (cyclic structure) |
| | tri- | (cyclic structure with $(CH_2)_5$) |
| | mono- | (cyclic structure) |
| | mono- | (cyclic structure) |
| | mono- | (cyclic structure) |

Further examples include iminocarbonic acid-bis-(sec.) amides of the following composition:

| Methylimino-, ethylimino-, cyanoethylimino-, dibutylaminobutylimino-, hexylimino-, stearylimino-, cyclohexylimino-, benzylimino-, phenylimino, p-chlorobenzylimino, 4-methyl-benzylimino- | carbonic acid | -bis-morpholide, -bis-piperidide, -bis-N'—methyl-piperazide |

Particularly suitable cyclic guanidine compounds are represented by the following formulae:

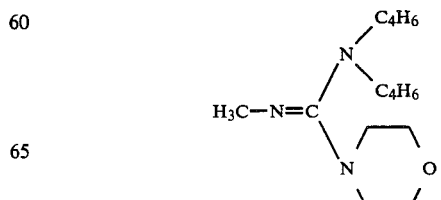

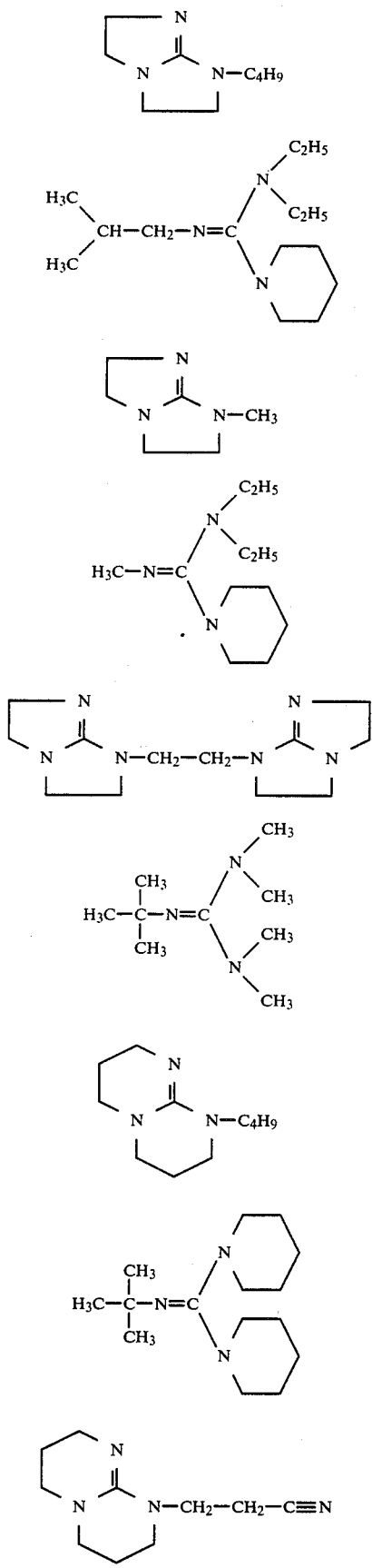

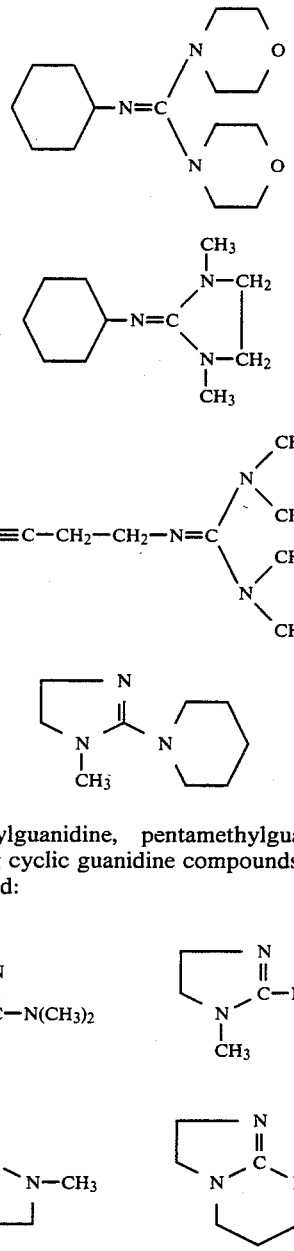

Tetramethylguanidine, pentamethylguanidine and the following cyclic guanidine compounds are particularly preferred:

Acid addition salts of the amidines or guanidines may be used instead of the free compounds, although these salts are less preferred. The term "acid addition salts" includes both salts which are formed with acid and salts which are formed with other proton donor compounds. The following are typical acids for the preparation of these salts: Monocarboxylic acids such as formic acid, acetic acid, propionic acid, butyric acid, caproic acid, valeric acid, octanoic acid, lauric acid, stearic acid and oleic acid; dicarboxylic acids such as oxalic acid, malonic acid, succinic acid, fumaric acid and adipic acid; hydroxylic acids such as glycolic acid, lactic acid, tartaric acid and the like; sulphonic acids such as alkyl or aryl sulphonic acids, sulphamic acid and sulphanilic acid; inorganic acids such as carbonic acid, phosphoric acid, hydrochloric acid, sulphuric acid and the like.

Other proton donor compounds include sulphonamides; phenols such as phenol, cresol or thiophenols; enols such as barbituric acid, uric acid and the like. Fatty acids having at least two carbon atoms and phenols are particularly preferred.

When acyclic, monocyclic or bicyclic amidines or guanidines are used for inactivating the solid polyisocyanates, a considerable increase in the surface stabilizing effect of the polyisocyanates may be observed when small quantities of water, low molecular weight glycols or amines are added to the reaction mixture.

One feature of the invention in the surface modification of solid polyisocyanates according to the invention is that the amidines or guanidines used for inactivation on the one hand result in considerable stabilization of the isocyanates at room temperature, even towards aromatically or aliphatically bound $NH_2$ groups (e.g. those present in relatively high molecular weight aliphatic polyamines) but still develop their catalytic activity in the process of heat curing (gelling reaction of the PVC plastisols with cross-linking of the polyisocyanates) at temperatures above the thickening temperature. This means that it is generally unnecessary to use additional catalysts of the kind hitherto required for rapid solidification of relatively inert active hydrogen compounds (e.g. with secondary OH end groups or with water).

The use of amidines and guanidines may be particularly advantageous if in addition to the above mentioned stabilization of the polyisocyanates it is required to catalyze the isocyanate reaction with the active hydrogen groups of the substrate. In addition, amidines and guanidines may initiate further secondary isocyanate reactions in the above mentioned polyisocyanates, e.g. opening of the uretdione ring in dimeric polyisocyanates, trimerization, allophanatization or biuretization. These secondary reactions may lead to a considerable improvement in the bonding effect on suitable substrates.

The above mentioned stabilizers may, of course, be used in any combination, for example, in order to compensate for disadvantageous side effects of an amine or amidine by the appropriate advantages of other amines or amidines (e.g. the use of low molecular weight and relatively high molecular weight diamines together) or in order to combine as many advantageous side effects as possible. The combinations used may be, for example, those of highly reactive amines such as ethylene diamine with amines which are slowed down in their reactions by steric hindrance or the combination of low molecular weight amines with high molecular weight amines, such as the combination of aliphatic amino polyethers or of polyamines with hydrazines or hydrazide derivatives. The quantity of polyamines used in addition to the hydrazine or hydrazine derivatives or amidines or guanidines is preferably not more than 50 mol -%, based on the total quantity of stabilizers used.

The combination of amines and amidines is also advantageous when it is desired to balance the stabilizing effect (influence on the processing temperature and time) and the isocyanate secondary reactions caused the amidines (influence on adherence to substrate).

The stabilizers are used in a quantity of from 0.1 to 25 equivalent-% of the inactivating group (e.g., $NH_2$, hydrazide, etc.) per equivalent of NCO in the polyisocyanate, preferably from 0.1 to 8 equivalent-%, and most preferably from 0.2 to 5 equivalent-%. Although formation of the polyadduct envelope may also be carried out with even higher proportions, e.g. 30 equivalent-% per NCO, such high reactions cause too great a reduction in the proportion of reactive isocyanate groups. In hydrazine, one equivalent is an $NH_2$ group (or an NH-alkyl group in the case of alkyl hydrazine derivatives) whereas in hydrazide compounds a —CO—NH—$NH_2$ group counts as one equivalent.

The temperatures chosen for the enveloping reactions are below the melting points of the polyisocyanate and are generally below 70° C., preferably from 0° to 50° C.

Stabilization of the isocyanate which is solid at room temperature against active hydrogen compounds is generally effected within a few minutes so that a continuous method may be employed for the preparation of the one-component systems.

The stabilization of the solid polyisocyanates by formation of a polyaddukt envelope preferably is carried out in a liquid medium which will not dissolve or is not a good solvent for the solid polyisocyanates.

The liquid medium may consist of low molecular weight or, preferably, relatively high molecular weight mono- or preferably polyols with OH numbers from 15 to 150, preferably from 20 to 120. Relatively high molecular weight polyols used as liquid medium are preferably the same as the relatively high molecular weight polyols used as component (c) in the mixture of the invention. They are preferably lightly branched, relatively high molecular weight polyester polyols of the kind already mentioned above. Other relatively high molecular weight polyhydroxyl compounds which may be used, provided they are compatible with the PVC plastisols include, for example, polyethers of the type known per se which may be obtained, for example, by the polymerization of tetrahydrofuran or of epoxides such as butylene oxide, epichlorohydrin, styrene oxide and/or propylene oxide and ethylene oxide by the chemical addition of starting components with reactive hydrogen atoms, such as water, polyhydric alcohols, ammonia, polyvalent amines or sugar.

The liquid medium used for the stabilization reaction may also consist of or include plasticizers or plasticizer type compounds, e.g. phthalates such as dioctyl-, diisododecyl-, dibenzyl- or butylbenzylphthalate or phosphates such as trioctyl phosphate or plasticizing compounds of the type which have already been described as plasticizers for the plastisol mixtures.

Hydrocarbons, such as so-called butadiene oils or relatively high molecular weight polyethers, optionally without hydroxyl end groups, may also be used as liquid medium. In this case, the finely powdered, solid isocyanate is stirred into a solution of the stabilizer in the plasticizer, if possible at room temperature.

The polyisocyanate suspension which has been stabilized as described above may subsequently be used for the preparation of the PVC/polyisocyanate mixture which is stable in storage at room temperature.

It is particularly preferred to prepare the stabilized polyisocyanate as suspensions with solid polyisocyanates in the plasticizers or as a solution of the relatively high molecular weight, lightly branched polyester polyols in a suitable plasticizer, so that they are obtained in the form of a suspension which may be used directly for the PVC mixtures.

The stabilized polyisocyanates are exceptionally stable in storage both when used in plasticizers alone and particularly when used in polyols or polyol/plasticizer mixtures, the stability being preserved even at elevated temperatures and in the presence of highly active polyurethane catalysts, PVC stabilizers or water.

Mixtures of this suspension with suitable PVC components (PVC plastisols) also have excellent stability in storage. When solid polyols are used, e.g. polyesters with relatively high melting point, it is advantageous to dissolve these polyols in a suitable plasticizer and then add the desired stabilizer to the solution obtained. After addition of the polyisocyanates in the form of a pure powder, in situ stabilization of the polyisocyanates is carried out in the presence of the polyol component.

The polyurethane forming reaction only takes place above a certain temperature, which in the case of PVC plastisol mixtures is above about 100° C. and for coatings with PVC plastisol mixtures is normally chosen in the region of 130° to 210° C., partly because gelling of the PVC takes place within this temperature range and because the reaction of the polyisocyanates with the reactive groups of the plastics or textile substrate and, if present the relatively high molecular weight hydroxyl compounds also takes place in this temperature range.

By simply varying the reaction conditions, e.g. the temperature for the enveloping reaction of the isocyanates, the choice of liquid medium or the nature and quantity of stabilizers used for stabilization, it is possible to vary the cross-linking temperature and obtain a higher stability in storage even at higher storage temperatures of the plastisol mixtures.

It was surprising to find that very effective adherence to the substrate occurs particularly when the polyisocyanates in the PVC mixture are enveloped in amidines and/or guanidines as stabilizers. This adherence is possibly due to the catalytic influence of the amidines on the isocyanate reactions at high temperatures which is unaccompanied by any discoloration or degradation of the PVC.

The quantity of stabilized polyisocyanates according to the invention is generally from 0.1 to 10% by weight, based on the total weight of the mixture, preferably from 0.3 to 6% by weight and in most cases most preferably from 0.5 to 3% by weight.

When lightly branched, relatively high molecular weight polyhydroxyl compounds are included, these are normally used in such quantities that the NCO/OH ratio lies within the range of 1.5:1 to 0.8:1, preferably from 1.2:1 to 1:1.

The quantity of plasticizers used is governed by the amount required to produce a pasty, spreadable PVC-plastisol, as known in the PVC-technique. Usually per 100 parts by weight of PVC-polymer are used 43–185 parts by weight of plasticizer and (preferably) 2–30 parts by weight of the lightly branched, relatively high molecular polyols.

The compositions according to the invention can be used as primers for coatings based on plasticized PVC, in particular for the manufacture of tarpaulins, portable hangars and other sheet products for textile structures, tent roofs, marquees, flexible containers, protective clothing, conveyor belts, flocked carpets or foam plastics used as artificial leather. The mixtures according to this invention are particularly suitable for use as primer coats on substrates containing isocyanate reactive groups, in particular for coating plastics, textile sheets or filaments based on chemical fibers such as polyamides or polyesters but also cellulose and other natural fibers.

The coatings may be applied by any conventional technique known in the art. For example, the compositions according to the invention may be applied to the substrates by printing, doctor knife, rastering or spraying or by immersion. Depending on the article to be produced, one or more than one PVC layer free from bonding agent may be applied to the pretreated substrate surface, e.g. as a plastisol or by extrusion or melt roller coating or by laminating.

Production of the finished layers, i.e. reaction of the isocyanate groups with the substrate and gelling of the PVC layer, is carried out in the usual manner at elevated temperatures, regardless of the method of application employed, the most usual temperatures used being within the range of 130° to 210° C., depending on the composition of the PVC layers. The mixtures according to the invention may also be used as primer for flocking, in which case the temperature is usually chosen to ensure that the properties of the flock fibers are not damaged during the heat curing reaction.

The examples given below serve to illustrate the invention in more detail. All percentages are based on percentages by weight.

EXAMPLES

EXAMPLE 1

(Comparison Experiment, Assessment of the Reactivity of Polyisocyanates towards Active Hydrogen Compounds)

(a) Unstabilized polyisocyanates suspended in plasticizer 56 g of a monomer-free, trimerized 2,4-diisocyanatotoluene (polyisocyanate, isocyanate content 15.5%) in the form of a finely milled powder (average grain size about 10 m) are suspended in 100 g of dioctyl phthalate (plasticizer).

(b) Reactivity test of the suspension (with aromatic diamine)

To test the reactivity of the polyisocyanate in heterogeneous phase with active hydrogen compounds 17 g of an aromatic diamine (2,4/2,6-diamino-3,5-diethyltoluene; 65/35 molar ratio of isomers) are added to the suspension. Polyaddition is completed after only a few minutes and a crumbly, solid mass of the polyurea in dioctylphthalate is obtained in an exothermic reaction. This mixture is thus shown to be unstable in storage.

EXAMPLE 2

(a) Surface stabilized polyisocyanate in plasticizer

When 0.4 g of 4,4'-diamino-3,3'-dimethyl-dicyclohexylmethane is added to the suspension of polyisocyanate in dioctylphthalate mentioned in Example 1a), the medium viscosity suspension remains unchanged at room temperature.

(b) Reactivity test of the suspension

Even after the addition of 17 g of 2,4/2,6-diamino-3,5-diethyltoluene, the suspension has unlimited stability in storage at moderately elevated temperatures (40° to 60° C.) (testing time: several months). Thickening (polyaddition) of the test mixture which contains diamines for the stability test only takes place at temperatures above 100° C.

EXAMPLE 3

(a) Surface stabilized polyisocyanate suspended in plasticizer

The aliphatic diamine mentioned in Example 2 is replaced by 0.2 g of ethylene diamine as stabilizing amine.

(b) Reactivity test

Addition of the aromatic diamine also gives rise to a suspension which is stable in storage at room temperature and reacts only at temperatures above 100° C.

EXAMPLE 4

(a) Surface stabilized polyisocyanate suspended in plasticizer

When the 0.2 g of ethylene diamine mentioned in Example 3 is replaced by 0.7 g of 1,2-bis-(2-methyltetrahydropyrimidinoyl-1)-ethane, a suspension which is storage stable at room temperature is obtained.

(b) Reactivity test

A suspension which is stable in storage at room temperature and hardens only above 100° C. is also obtained by the addition of 17 g of 2,4/2,6-diamino-3,5-diethyl-toluene.

EXAMPLE 5 (according to the invention)

(a) Preparation of the PVC plastisol 1000 g of a PVC paste of the type: K-value 74 (DIN 53 726) are homogeneously mixed with 700 g of dioctyl phthalate and 12 g of barium-cadmium laurate, using a three-roll mill.

(b) Preparation of the mixture of bonding agent and PVC 5.6 g portions of the suspensions of polyisocyanates in dioctyl phthalate indicated in Examples 1(a) to 4(a) are added in each case to 100 g of this PVC plastisol 5(a).

Whereas the mixture of PVC plastisol and bonding agent described in Example 1(a) (containing unstabilized polyisocyanate) thickens considerably after 24 hours so that it can no longer be processed (comparison experiments), the mixtures of plastisol and bonding agent according to Examples 2(a) to 4(a) (using the surface modified, stabilized polyisocyanates according to the invention) undergo virtually no change in viscosity even when left to stand for 30 days. These plastisols are and remain in all cases easily spreadable.

The polyisocyanate-containing PVC plastisols of Examples 1 to 4 are applied to a test fabric of Polyamide 66 (940 dtex, weave L1/1, setting: 9.0/9.5 threads per cm), using a doctor knife to form a layer weighing 100 g/m². The plastisols are gelled and heat cured at 140° C. in a circulating air oven heated with hot air. A top coat of PVC plastisol free from bonding agent is applied to this primer coat in a quantity of 250 g/m² and the combination is cured in a circulating air oven at 180° C. The bond strength is measured on samples 5 cm in width which have been punched out of the coating (DIN 53 357). The bond strengths obtained are 185 N/5 cm in all four cases. The plastisol mixture from Example 1 (comparison experiment with unstabilized polyisocyanate) very rapidly loses its fluidity in the process of spread coating while the plastisol mixtures according to the invention containing 2(a) to 4(a) remain spreadable over a long period and even when left to stand for 30 days and then again coated they show virtually the same coating characteristics and same bond strength.

EXAMPLE 6 (Comparison example)

A. 72 g of dimeric 2,4-diisocyanatotoluene in the form of a finely ground powder (average grain 15 m) are stirred into a solution of 100 g of a lightly branched polyester of 4 mol of adipic acid, 4 mol of hexane-1,6-diol and 1 mol of trimethylolpropane (OH number 143) in 100 g of benzyl-butyl phthalate (as plasticizer). This suspension of unstabilized polyisocyanate is not stable in storage at room temperature. The suspension thickens to a solid, no longer pourable product after a few hours.

B. To assess the storage stability of the bonding agent component of Example 6A in the PVC plastisol, 100 g of PVC plastisol having the following composition:

300 g of PVC/paste type: K-value 70 according to DIN 53,726
  300 g of PVC/paste type: K-value 80 according to DIN 53 726
  400 g of $C_{10}$–$C_{18}$ alkane sulphonic acid phenyl ester
  60 g of kaolin
  20 g of dibasic lead phosphite and
  10 g of chromium trioxide/green are homogeneously mixed with 5.5 g of the polyester (OH-number 143) according to Example 6A.

2 g of dimeric 2,4-diisocyanatotoluene are added to this PVC mixture 6B. After 10 to 15 hours, the viscosity of the PVC/plastisol mixture has increased to such an extent that the mixture can no longer be processed.

EXAMPLE 7

The following stabilizers are added at the given concentration to, in each case, 272 g of the suspension mentioned in Example 6A of polyester/benzylbutyl phthalate and dimeric 2,4-diisocyanatotoluene:

(a) 1.5 g of piperazine, (b) 1.5 g of piperazine and 1.0 g of 1,2-dimethyl-tetrahydropyrimidine, (c) 2.0 g of 1,5,7-triaza-N-cyclohexyl-bicyclo-[4,4,0]-dec-5-ene.

All three suspensions are found to be stable in storage at room temperature. When blended with PVC plastisols the compositions do not undergo any thickening even after months of storage.

EXAMPLE 8

31.4 g of dimeric 2,4-diisocyanatotoluene are added to 100 g of a liquid, lightly branched polyester of 4 mol of adipic acid, 2 mol of hexane-1,6-diol, 2 mol of propane-1,2-diol and 0.91 mol of trimethylolpropane (OH number 106). 1.0 g of 4,4'-diamino-3,3'-dicyclohexylmethane is then added. The mixture obtained undergoes no change at room temperature. Its viscosity remains indefinitely stable in storage.

EXAMPLE 9

80 g of a lightly branched polyester of 2 mol of adipic acid, 12 mol of azelaic acid, 2 mol of hexane-1,6-diol, 2 mol of propane-1,2-diol and 0.9 mol of trimethylol propane are mixed with 20 g of alkyl ($C_{10}$ to $C_{18}$)-sulphonic acid phenyl ester (Mesamoll ® BAYER AG). To this solution are added 1.5 g of 4,4'-diaminodicyclohexylmethane. 28 g of dimeric 2,4-diisocyanatotoluene are then added to the reaction mixture with stirring. This suspension also remains stable in storage at room temperature for long periods.

EXAMPLE 10

7.5 g of the polyisocyanate preparation according to Examples 7a, 7b and 7c are added in each case to 100 g of the PVC plastisol from Example 6B. The viscosity of these plastisol mixtures of the type according to the invention is virtually unchanged after 30 days storage at room temperature. The plastisols are still readily pourable and can easily be processed. The bond strength of coatings of these plastisols on Polyamide 66 fabric (940 dtex) and polyester fabrics (1100 dtex) is as follows:

| PVC plastisol according to | Bond strength (N/5 cm) | |
|---|---|---|
| | Polyamide 940 dtex | Polyester 1100 dtex |
| Example 7a | 145 | 125 |
| Example 7b | 185 | 115 |
| Example 7c | 150 | 120 |

It is surprisingly found that the bond strength of the compositions according to Example 7 is substantially improved due to the catalytic effect of 1,2-dimethyl-tetrahydropyrimidine on the reaction of the polyisocyanate with the active hydrogen groups of the polyamide substrate.

EXAMPLE 11

100 g of the PVC plastisol mixture from Example 6B are mixed with 10.5 g of the polyisocyanate preparation from Example 8. Virtually no change in viscosity is found after 30 days storage at room temperature. The bond strength obtained is 155 N/5 cm on Polyamide 6 fabrics and 125 N/5 cm on polyester.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is stable in storage and which is heat curable at a temperature of from 100° C. to 200° C. comprising:
   (A) a polyvinyl chloride plastisol,
   (B) a surface modified, finely divided, stabilized polyisocyanate having retarded reactivity prepared by deactivating from 0.1 to 25 equivalent percent of the isocyanate groups of a finely divided, solid polyisocyanate having a melting point above 40° C. with a member selected from the group consisting of
      (i) aliphatic or cycloaliphatic di- and polyamines,
      (ii) hydrazine, alkylhydrazines, N,N'-dialkylhydrazines, and di- and polyhydrazide compounds, and
      (iii) acyclic, monocyclic or bicyclic amidines and guanidines, and
   (C) a member selected from the group consisting of
      (i) plasticizers for polyvinyl chloride,
      (ii) lightly branched, relatively high molecular weight polyhydroxyl compounds which are compatible with component (A) and which have hydroxyl functionalities of from 2 to about 4 and hydroxyl numbers of from about 15 to 150, and
      (iii) mixtures thereof.

2. The composition of claim 1 wherein component (C) (ii) has a melting point below 60° C.

3. The composition of claim 1 characterized in that the solid, finely divided polyisocyanates used for surface modification have melting points above 80° C.

4. The composition of claim 1 wherein said solid polyisocyanate is selected from the group consisting of 3,3'-diisocyanate-4,4'-(or 2,2')-dimethyl-N,N'-diphenylurea, dimeric 2,4-diisocyanatotoluene, dimeric 4,4'-diisocyanatodiphenylmethane, 3,3'-dimethyl-4,4'-diisocyanatodiphenylmethane and the isocyanurates (trimers) based on 2,4-diisocyanatotoluene, 4,4'-diisocyanatodiphenylmethane and isophorone diisocyanate.

5. The composition of claim 1 wherein component (B) is a surface modified polyisocyanate in which from 0.1 to 25 equivalents-% of the isocyanate groups of the solid, finely divided polyisocyanate have undergone reaction with a member selected from the group consisting of aliphatic polyamines, hydrazines, alkylhydrazines, N,N'-dialkylhydrazines, polyhydrazide compounds, amidine compounds, guanidine compounds and mixtures thereof.

6. The composition of claim 5 characterized in that the solid polyisocyanate is directly reacted in component (C) and mixed in this form with component (A).

7. The composition of claim 1 wherein component (B) comprises from 0.1 to 10% by weight of the total composition.

8. The composition of claim 7 wherein component (B) comprises 0.3 to 6% by weight of the total mixture.

9. The composition of claim 7 characterized in that the surface modified component (B) and component (C) (ii) are contained in such quantities that the NCO/OH ratio lies in the range of from 1.5:1 to 0.8:1.

10. The composition of claim 1 wherein component (C) (ii) is an hydroxyl group-containing polyester having a functionality from 2.1 to 4 and an OH number from 20 to 120, and being derived from an aliphatic di- or tricarboxylic acid having at least 6 carbon atoms and a diol having at least 3 carbon atoms.

* * * * *